(No Model.) 2 Sheets—Sheet 1.

A. C. CAMPBELL.
FEEDING MECHANISM FOR SEWING MACHINES.

No. 331,183. Patented Nov. 24, 1885.

Witnesses:
F. L. Emery
D. J. Noyes

Inventor:
Andrew C. Campbell
by Crosby & Gregory
attys (No Model.)  2 Sheets—Sheet 2.

A. C. CAMPBELL.
FEEDING MECHANISM FOR SEWING MACHINES.

No. 331,183. Patented Nov. 24, 1885.

Witnesses:
F. L. Emery
D. H. Noyes

Inventor:
Andrew C. Campbell
by Crosby & Gregory
attys

UNITED STATES PATENT OFFICE.

ANDREW C. CAMPBELL, OF BRIDGEPORT, CONNECTICUT, ASSIGNOR TO THE WHEELER & WILSON MANUFACTURING COMPANY, OF SAME PLACE.

FEEDING MECHANISM FOR SEWING-MACHINES.

SPECIFICATION forming part of Letters Patent No. 331,183, dated November 24, 1885.

Application filed July 27, 1885. Serial No. 172,737. (No model.)

*To all whom it may concern:*

Be it known that I, ANDREW C. CAMPBELL, of Bridgeport, county of Fairfield, and State of Connecticut, have invented an Improvement in Feeding Mechanisms for Sewing-Machines, of which the following description, in connection with the accompanying drawings, is a specification, like letters on the drawings representing like parts.

This invention has for its object to improve the construction of the feeding mechanism, whereby accuracy of movement as well as durability is increased.

In accordance with my invention the feeding-bar derives its reciprocation from a cam on a rotating driving-shaft through the intervention of an elbow-lever, a rock-shaft, and two links pivoted together and jointed the one to one arm of the said rock-shaft and the other to one end of the said elbow-lever, the center pin or joint connecting the two links together being located between the main shaft and the points of connection of the said links with the arm of the rock-shaft and the end of the elbow-lever, movement of the said center pin in the arc of a circle toward or from the center of motion of the elbow-lever shortening or lengthening the stitch, the nearer the said center pin to the center of movement of the elbow-lever the shorter the stitch, and vice versa.

My invention consists, essentially, in a feeding-bar, a rock-shaft to move it, a cam, and a shaft to rotate it, and an elbow-lever or rocking arm vibrated by the said cam, combined with two links pivoted together and connecting one arm of the said elbow-lever with one arm of the rock-shaft for reciprocating the feeding-bar, and with means to adjust the said links to vary the length of stitch, the center pin connecting the links each with the other being located between the main shaft and the points of connection of the said links with the said rock-shaft and elbow-lever.

Figure 1:
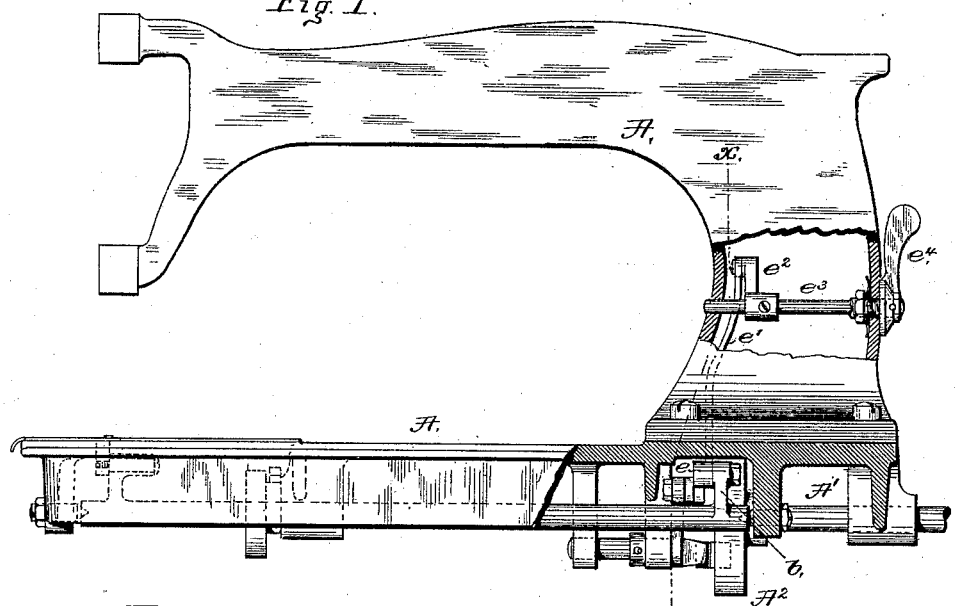
Figure 2:
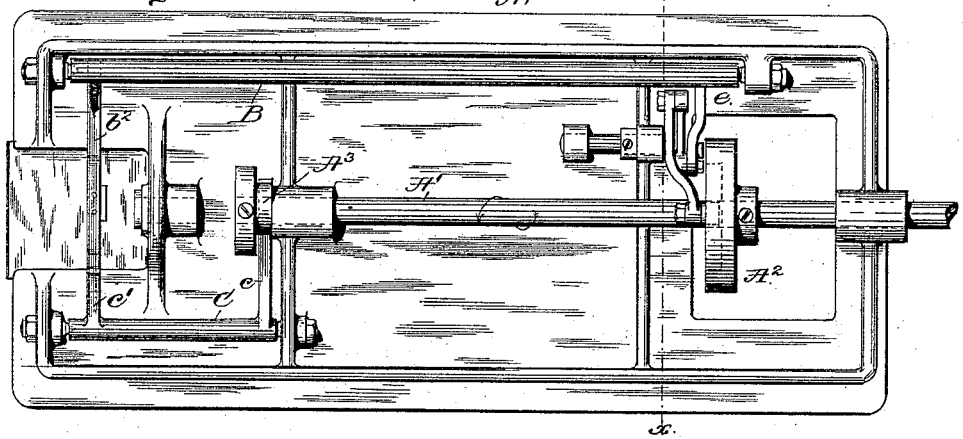
Figure 3:
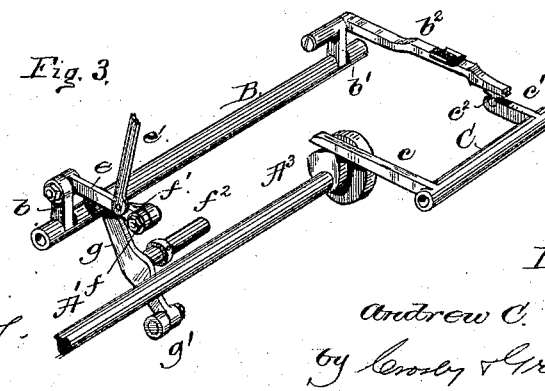
Figure 4:
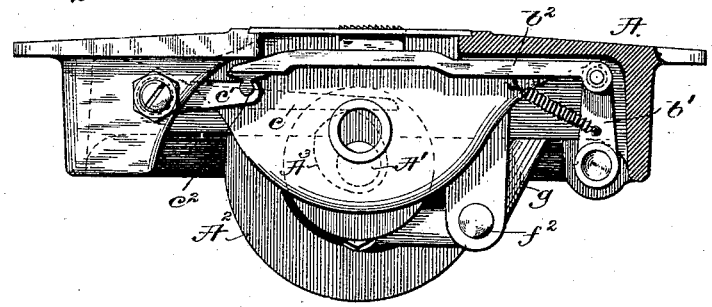
Figure 5:
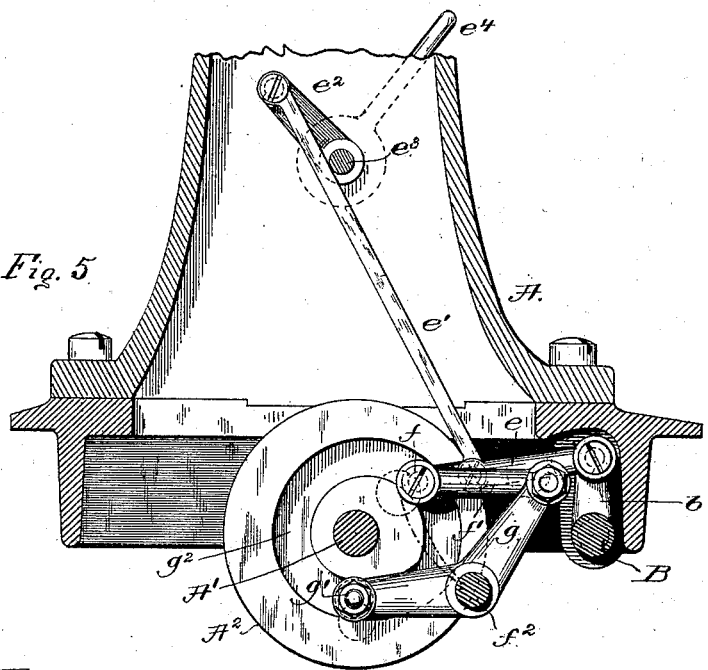
Figure 6:
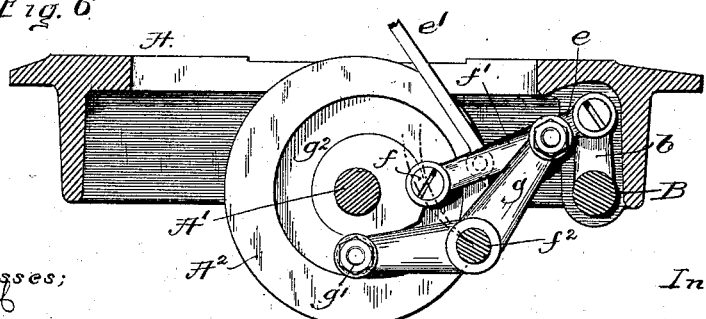

Figure 1 in side elevation represents a sufficient portion of a sewing-machine, partially broken out, to show my invention; Fig. 2, an under side view thereof; Fig. 3, a diagram of some of the parts in perspective; Fig. 4, a left-hand end view of Fig. 1; Fig. 5, a section in the dotted line $x\,x$, Figs. 1 and 2; and Fig. 6 shows the parts in a different position to make a shorter stitch than in Fig. 5.

The frame-work A, of usual shape, contains a main rotating shaft, A', having a grooved cam, $A^2$, and a peripheral cam, $A^3$, a rock-shaft, B, having arms $b\,b'$, the latter having joined to it one end of the feeding-bar $b^2$. The rock-shaft C has an arm, $c$, to rest on the cam $A^3$, and an arm, $c'$, to extend under and raise and lower the feeding-bar. The arm $b$ has attached to it a link, $e$, which is made adjustable by a link, $e'$, extended to an arm, $e^2$, of a rock-shaft, $e^3$, provided with an adjusting-handle, $e^4$.

The parts so far described are not of my invention.

The free end of the link $e$ is connected loosely by the center pin, $f$, with a second link, $f'$, jointed in turn to the upper end of an elbow-lever or rocking arm, $g$, having its fulcrum at $f^2$, and provided with a roller or other stud, $g'$, which enters the cam-groove $g^2$ of the cam-hub $A^2$. The center pin, $f$, joining the two links $e\,f'$, is located between the shaft A' and the points where the said links are joined to the arm $b$ and to the elbow-lever $g$. The center pin, as it is moved to adjust the length of stitch, is moved in an arc of a circle which cuts the fulcrum of the elbow-lever.

Adjustment of the link $f'$ to place and keep the center pin, $f$, at a greater or less distance from the fulcrum $f^2$ increases or decreases the length of stitch.

In Fig. 5 the adjustment is that for a long stitch, while in Fig. 6 the adjustment is for a shorter stitch.

The arm $c'$ of the rocking shaft C is provided with a rocking shoe, $c^2$, on which the under side of the feeding-bar at its free end rests and slides, the shoe reducing friction.

Instead of the particular devices shown by which to adjust the link $e$, I may employ any other usual or well-known devices which will permit the said link to be raised or lowered as needed, and to be then held, but yet permit the link to have an extent of longitudinal movement sufficient to actuate the rock-shaft B for the desired distance.

I claim—

The rotating shaft, its attached cam, and the elbow-lever actuated by it, and the feeding-bar and the rock-shaft to reciprocate it to effect the feeding movement of the material, combined with the two links $e\ f'$, pivoted together at $f$, one of the said links being connected with the said elbow-lever, while the other of the said links is connected to an arm of the said rock-shaft that reciprocates the feeding-bar, and with means to adjust the center pin joining the said links toward and from the center of motion of the said elbow-lever, ro substantially as described.

In testimony whereof I have signed my name to this specification in the presence of two subscribing witnesses.

ANDREW C. CAMPBELL.

Witnesses:
ISAAC HOLDEN,
LOUIS H. BAKER.